March 9, 1943.   G. W. BUNGAY   2,313,623
PRESS FOR MAKING ELECTROTYPE MOLDS
Filed Sept. 27, 1940   5 Sheets-Sheet 1

INVENTOR.
GEORGE W. BUNGAY
BY WM. S. Pritchard
ATTORNEY.

March 9, 1943.  G. W. BUNGAY  2,313,623

PRESS FOR MAKING ELECTROTYPE MOLDS

Filed Sept. 27, 1940  5 Sheets-Sheet 3

INVENTOR.
GEORGE W. BUNGAY
BY Wm. S. Pritchard
ATTORNEY.

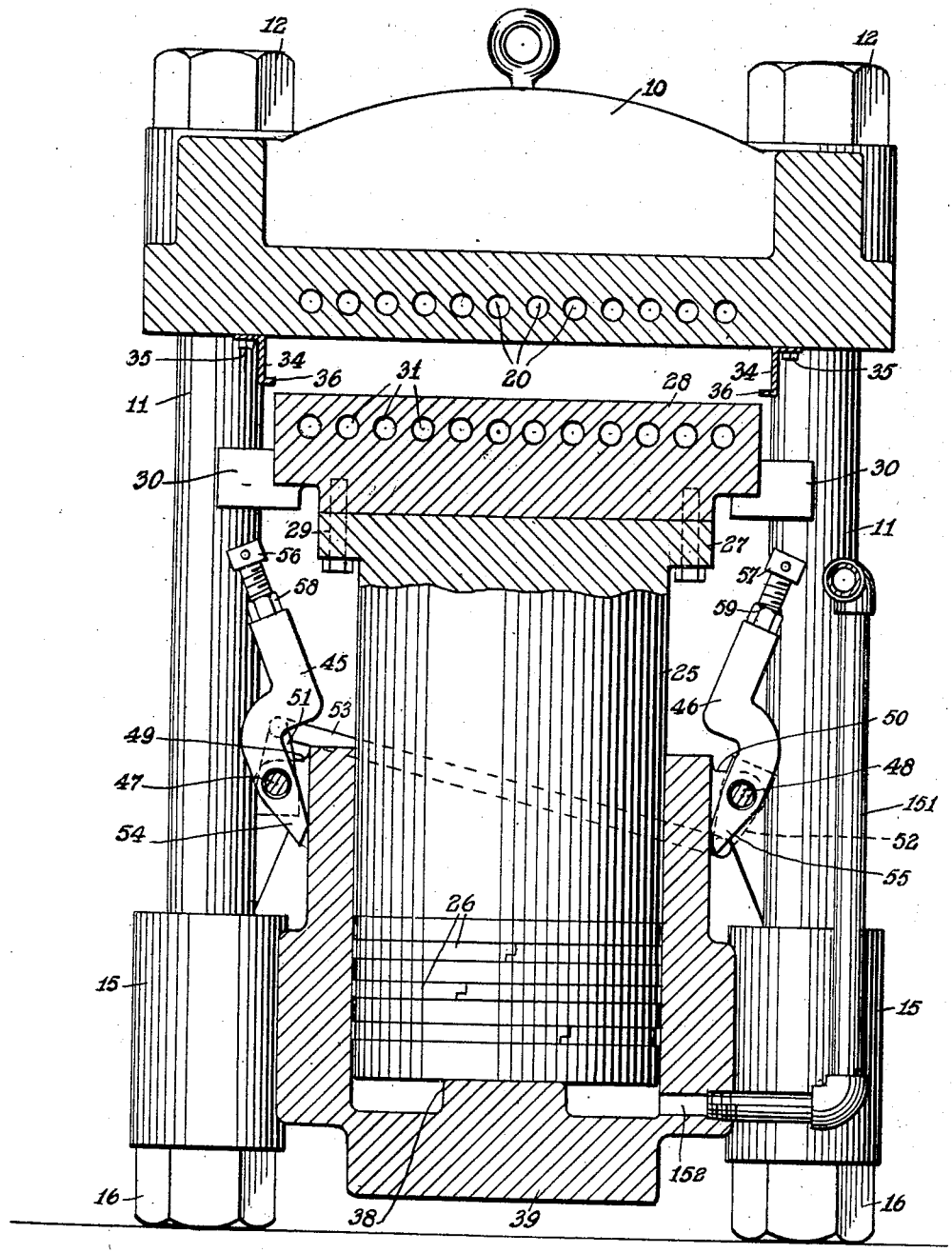

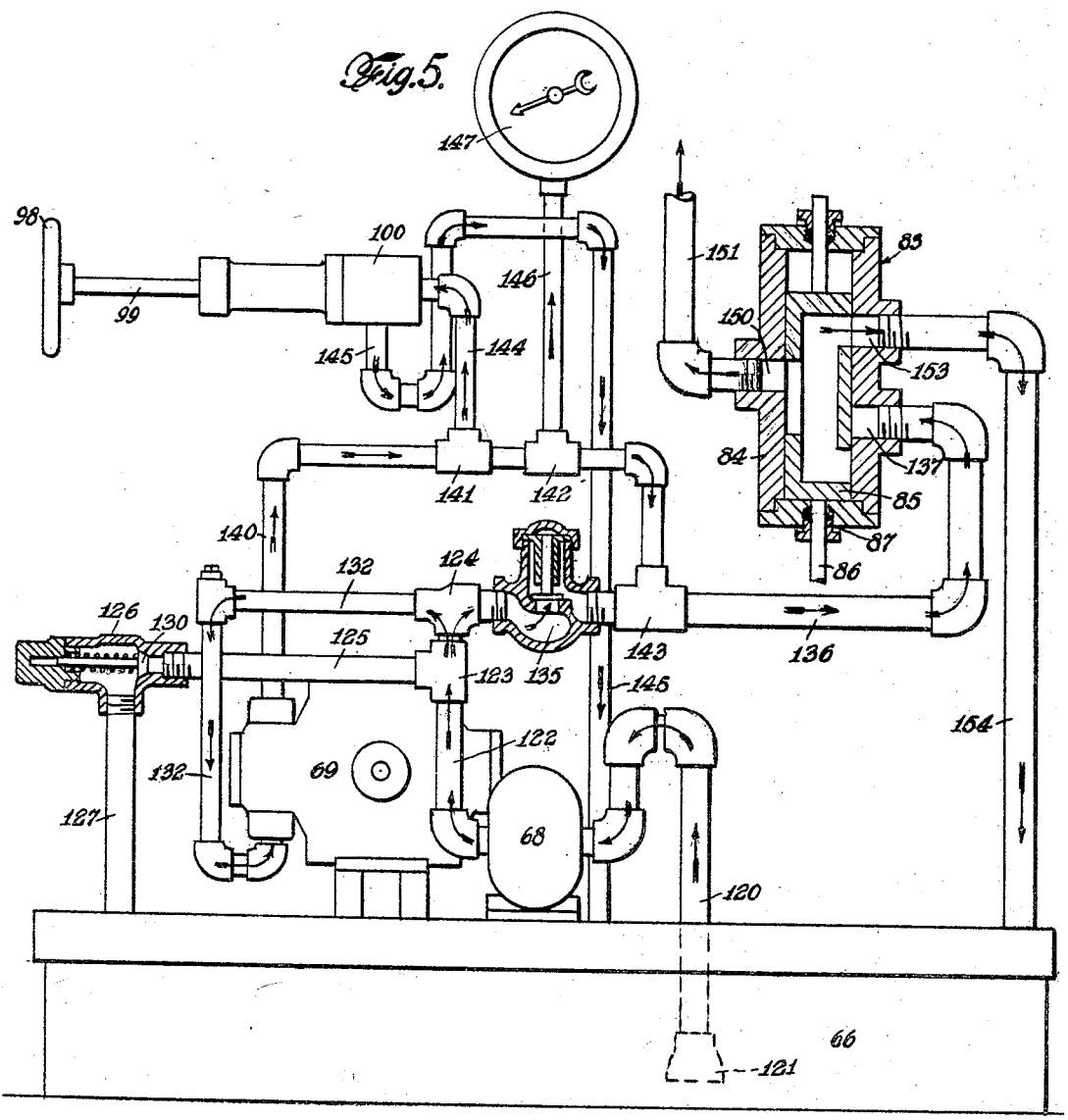

Patented Mar. 9, 1943

2,313,623

UNITED STATES PATENT OFFICE 2,313,623

PRESS FOR MAKING ELECTROTYPE MOLDS

George W. Bungay, New York, N. Y.

Application September 27, 1940, Serial No. 358,741

9 Claims. (Cl. 18—16)

This invention relates to a hydraulic molding press for making a thermoplastic electrotype mold of the type and according to the process set forth in my copending application, Serial No. 358,739, for "Electrotype mold and method of making same," filed on even date herewith. That application discloses a process in which a sheet of synthetic thermoplastic material is blackleaded, placed on the type form which is to be impressed therein, is heated to a temperature suited to render the thermoplastic material pliable for molding, and is then molded under high pressure in a press having cooling means associated therewith so that the sheet is cooled and set while under molding pressure.

An object of the present invention is to provide a molding press for the above purpose having novel and improved details of construction and combinations of parts.

Another object is to provide a molding press of the type above indicated which may be set to exert a predetermined molding pressure.

Another object is to provide a molding press of the above type which is quick-acting and which maintains a predetermined pressure during the molding operation.

Another object is to provide a novel and improved molding press of the above type which is capable of forming and immediately cooling the thermoplastic material so as to produce a thermoplastic mold having characteristics suited for making an electrotype plate therefrom.

Another object is to provide a molding press of the above type which is suited for operation under commercial conditions.

Various other objects and advantages will be apparent as the nature of the invention is more fully disclosed.

Although the novel features which are believed to be characteristic of this invention are pointed out more particularly in the claims appended hereto, the invention itself will be better understood by referring to the following description, taken in connection with the accompanying drawings in which a specific embodiment thereof has been set forth for purposes of illustration.

In the drawings,

Figure 4 is a vertical section taken on the line 4—4 of Figure 3;

Figure 5 is a diagrammatic view showing the hydraulic system; and

Figure 6 is a longitudinal section through the adjustable, spring-loaded, pressure-regulating valve.

Figure 1:
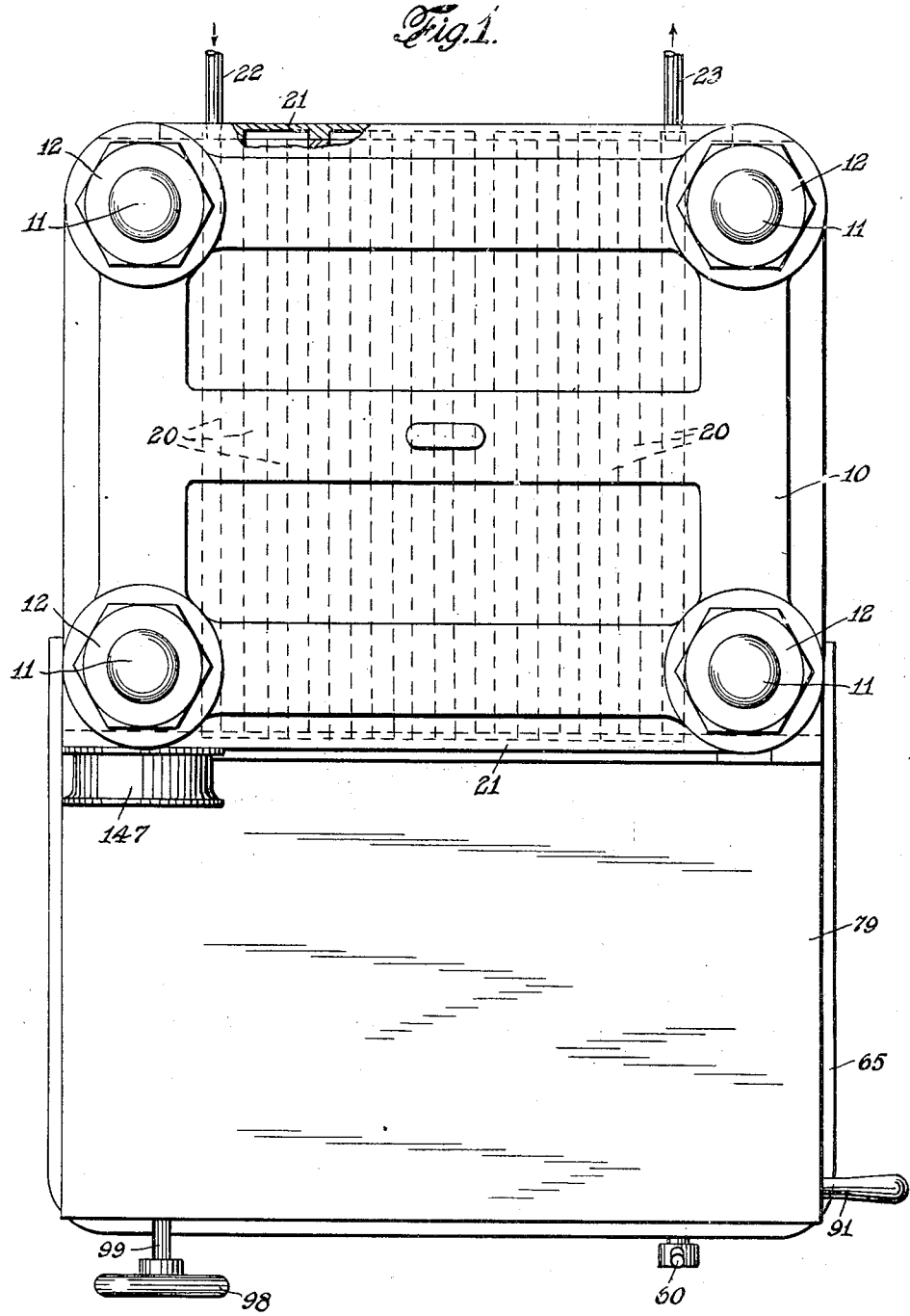
Figure 1 is a top plan view of a forming press embodying the present invention.

In the following description and in the claims, certain specific terms are used for convenience in referring to various details of the invention. These terms, however, are to be given as broad an interpretation as the state of the art will permit.

Referring to the drawings more in detail, the press is shown as comprising a stationary head 10 (Figures 1 to 4) which is mounted on a plurality of pedestal bolts 11. The head is supported upon suitable shoulders formed on said pedestal bolts 11 and is secured by securing nuts 12. A cylinder 14 (Figures 3 and 4) is provided with a plurality of bosses 15 through which the pedestal bolts 11 extend and which rest on the bolt heads 16.

The head 10 is provided with a plurality of ducts 20 which may be formed in said head or may comprise pipes cast therein (Figures 1 and 4). The ducts 20 extend entirely across the head and are connected for the serial flow of fluid therethrough by cover plates 21. The fluid, such as cooling water, is supplied by a supply pipe 22 and is discharged through a discharge pipe 23.

The cylinder 14 (Figure 4) contains a piston or ram 25 carrying a plurality of piston rings 26. The upper end of the ram 25 is provided with a flange 27 and carries a platen 28 which may be secured thereto by bolts 29 which extend through said flange 27. The platen 28 is formed with guides 30 having arcuate surfaces bearing against the pedestal bolts 11 for guiding the platen as it is raised and lowered by the ram 25. The platen 28 is provided with a plurality of ducts 31 which may be formed therein or may comprise pipes cast therein and connected in a manner similar to the ducts 20 of the head 10 for the serial flow of fluid therethrough.

A pair of brackets 34 are shown as secured to the head 10 by bolts 35. The brackets 34 are provided with horizontal flanges 36 which are spaced to provide clearance for the passage of the platen 28 therebetween and are elevated above the top surface of the platen when the latter is in its lower position.

In its lower position, the platen 28 rests upon a boss 38 forming a part of the head 39 of the cylinder 14. In order to hold the platen in a slightly raised position, for example in a position wherein the top surface thereof registers with the flanges 36 of the brackets 34, a pair of stop arms 45 and 46 are provided. The arms 45 and 46 are mounted on rods 47 and 48 respectively which are journaled in bosses 49 and 50 formed on the cylinder 14. The rods 47 and 48 extend to the back of the cylinder 14 and carry arms 51 and 52 respectively which are connected by a cross link 53, the arrangement being such that the link 53 causes the stop arms 45 and 46 to swing in unison to their operative or in operative positions. Stops 54 and 55 are formed on the stop arms 45 and 46 to limit their outward movement (as shown in Figure 4). Adjustable bolts 56 and 57 are secured in the upper ends of the arms 45 and 46. These bolts may be adjusted and secured by lock nuts 58 and 59 respectively and are adapted, when the arms 45 and 46 are swung inwardly, to engage beneath the flange 27 of the ram 25 and thus limit the downward movement of the platen 28. One of the rods 47 or 48, shown, for example, as the rod 48 (Figure 3), extends to the front of the machine and carries a set lever 60 by which the position of the arms 45 and 46 is controlled.

A platform 65 (Figures 2 and 3) is secured to the bosses 15 and extends to the front of the press. A reservoir 66 is attached to the platform 65 and rests upon the floor to provide a support for said platform. The platform 65 carries a motor 67, a low pressure pump 68, and a high pressure pump 69. The pumps 68 and 69 are connected, by suitable gears (not shown) mounted in a gear box 70, to the shaft 71 of the motor 67. A starting box 72, containing the usual motor-starting relays, may be mounted on the motor 67.

A pair of vertical brackets 75 are attached to saddles 76 which are clamped by means of U-bolts 77 to the front pedestal bolts 11. The brackets 75 carry a hot table 80 which is attached thereto by bolts 81 and is provided with a plurailty of ducts 82 by which heating fluid, such as steam, may be circulated therethrough. The hot table 80 is provided with a top 79, forming a heated apron for the purpose to be described.

One of the brackets 75 carries a control valve 83 which, as shown more in detail in Figure 5, comprises a housing 84 and a valve slide 85 attached to a valve rod 86 which extends through a suitable packing gland 87 in the housing 84. The control rod 86 is attached by means of a link 90 (Figure 2) to an operating handle 91 which is pivoted on a plate 92 attached to the valve 83. A push-button switch 94 for controlling the operation of the motor 67 is also attached to said bracket 75.

The other bracket 75 carries an adjusting wheel 98 attached to a shaft 99 which actuates an adjustable spring-loaded, pressure-regulating valve 100 (shown in detail in Figure 6). The valve 100 comprises a housing 101 having a valve chamber 102 formed therein and communicating with an inlet port 103 and an outlet port 104. A valve plunger 105 is provided with a conical valve surface 106 normally seated against a registering surface of the housing to close the inlet port 103 and held in that position by a compression spring 107. The spring 107 is seated between the valve plunger 105 and a ball-bearing collar 108 which is carried by a pin 109 formed on the end of the shaft 99. The shaft 99 is threaded, as at 110, in the housing 101 and extends outwardly through a packing gland 111 containing suitable packing 112, shown as a U-shraped annular packing of the expansible type.

The plunger 105 is provided with a pin 114 which is adapted to engage the pin 109 on the shaft 99 to form a stop for limiting the movement of the plunger. The plunger is made to have a sliding fit in the valve chamber 102 and has sufficient clearance to permit the fluid to leak past the plunger and fill the entire space within the chamber. The fluid thus exerts a damping effect and prevents the plunger from chattering. The housing 101 is also provided with a chamber 115 which provides clearance for the threaded portion of the shaft 99. Suitable leakage ducts (not shown) may be formed in the housing to permit the fluid from the chamber 102 to enter and fill the chamber 115 and the packing gland 111 so as to maintain the entire device under pressure and to expand the U-shaped packing 112 so as to make a fluid-tight seal with the shaft 99.

The piping connections for supplying fluid under pressure to the cylinder 14 may be best understood by referring to Figure 5. The low pressure pump 68, which may comprise a gear pump of any well-known type, is connected by a pipe 120 to receive fluid, such as oil, from the reservoir 66. A suitable strainer or the like 121 may be attached to the inlet end of the pipe 120. The high pressure side of the pump 68 is connected by a pipe 122 through a T-coupling 123 to a reducing coupling 124. The coupling 123 is connected by a pipe 125 to a pressure-relief valve 126 of standard construction, and thence through a pipe 127 to the reservoir 66. The pressure-relief valve 126 is provided with a spring-loaded plunger 130 which normally closes the valve 126 but allows the same to open when the pressure in the pipe 125 is built up to a predetermined value.

The reducing coupling 124 is connected by a pipe 132 to the low pressure side of the high pressure pump 69, which may be of any convenient type, such as a rotary piston pump, suited to build up a fluid pressure of several tons per square inch, but to discharge a comparatively small quantity of fluid. The coupling 124 is also connected through a check valve 135 and a pipe 136 to a port 137 of the control valve 83. The check valve 135 permits the fluid to flow from the pump 68 to the control valve 83 but prevents flow of fluid in the reverse direction.

The high pressure side of the high pressure pump 69 is connected by means of a pipe 140 through couplings 141 and 142 to a coupling 143 in the pipe 136. The coupling 141 is connected by a pipe 144 to the inlet port 103 of the spring-loaded, pressure-regulating valve 100. The outlet port 104 of said valve is connected by a pipe 145 to the reservoir 66. The coupling 142 is connected by a pipe 146 to a pressure gauge 147.

Figure 2:
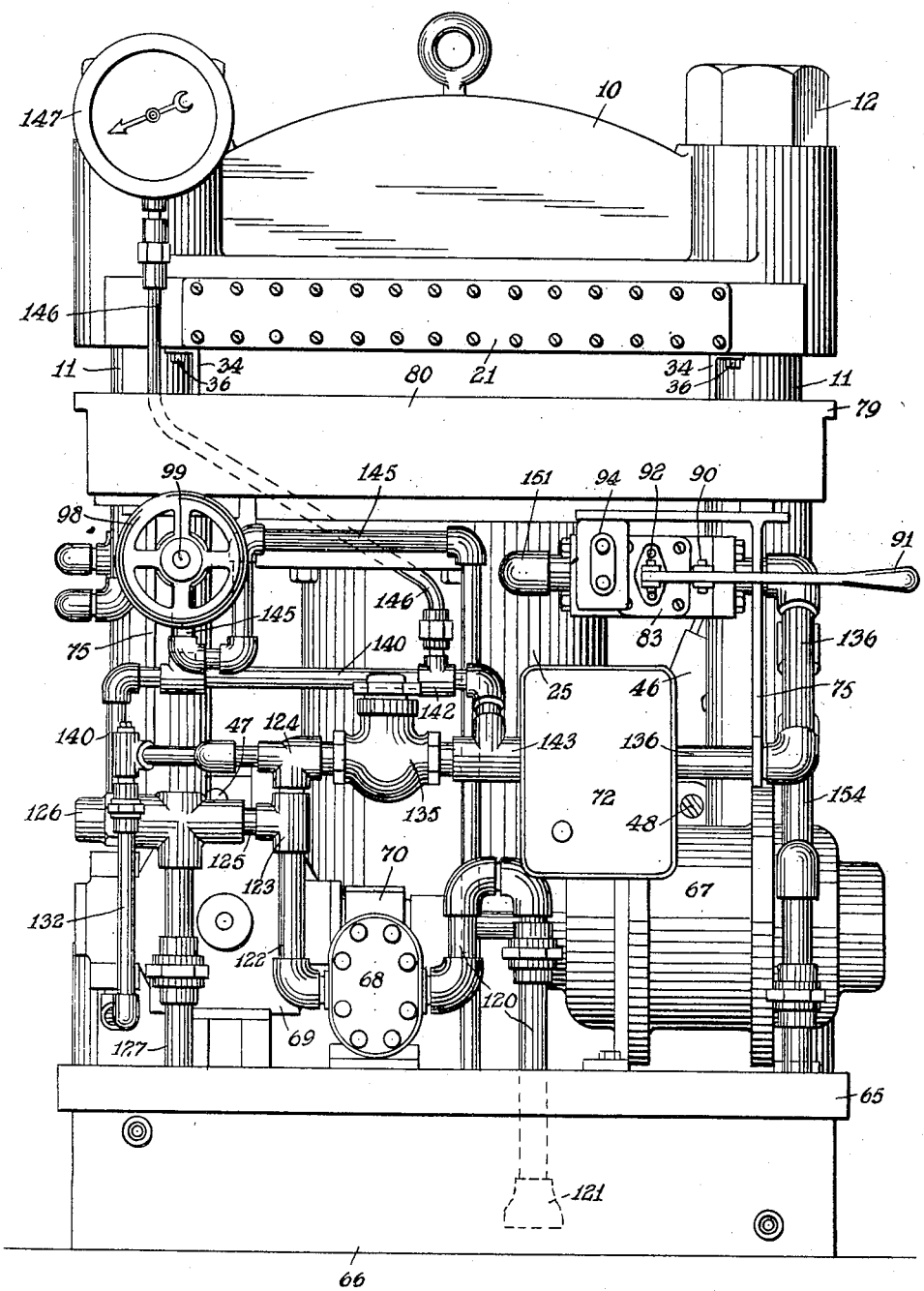
Figure 2 is a front elevation thereof.
Figure 3:
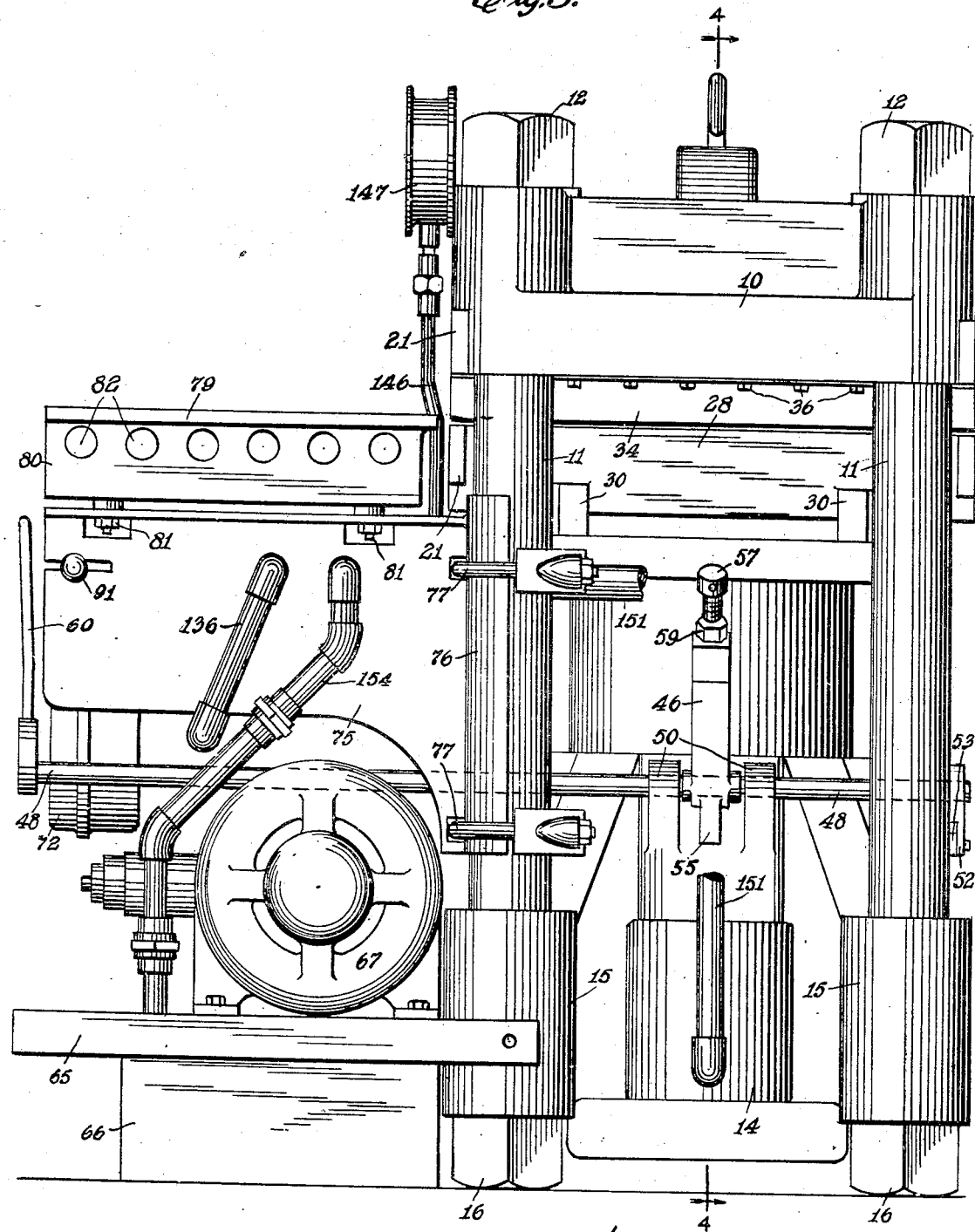
Figure 3 is a side elevation thereof.

The control valve 83 is provided with an outlet port 150 which is connected by a pipe 151 to a port 152 in the cylinder 14 (Figure 4). The valve 83 is also provided with a return port 153 which is connected by a pipe 154 to the reservoir 66. The valve slide 85 is adapted to connect the outlet port 150 of the valve 83 to either the inlet port 137 or the return port 153 according to the position thereof as determined by the position of the operating handle 91 (Figure 2).

In the operation of this press for the molding of a thermoplastic electrotype mold in accordance with the process set forth in my copending application above mentioned, a thermoplastic sheet material is placed upon a type form or the like, the impression of which is to be transferred to the sheet. A suitable soft backing material is applied thereto, and the assembly is heated by suitable means to a temperature sufficiently high to render the thermoplastic material pliable for molding. The assembly is then placed upon the apron 79 which is maintained, by means of a heating fluid, such as steam, circulated through the ducts 82, at a temperature sufficiently high to prevent the form and thermoplastic sheet from cooling appreciably before they are inserted in the press.

The stationary head 10 and the platen 28 are maintained cool by means of a cooling fluid, such as cold water, which is circulated through the ducts 20 and 31 respectively. If the type form is composed of the usual type and half-tone cuts which are of substantial thickness and are consequently capable of retaining heat for an appreciable time, the platen 28 is brought into alignment with the flanges 36 of the brackets 34. For this purpose, the stop arms 45 and 46 are shifted, by operation of the set lever 60, into operative position wherein they engage beneath the flange 27 of the ram 25. The bolts 56 are then adjusted to engage the flange 27 of the ram 25 and stop the downward movement thereof when the platen 28 reaches the desired level. The form, together with the thermoplastic sheet material and the backing material, is then slid into the channel formed by the brackets 34, the flanges 36, and the top of the platen 28. The cold platen 28 tends to cool the form, but inasmuch as the forming operation takes place immediately, the temperature of the thermoplastic sheet material is not appreciably lowered thereby until the forming operation is completed by the operation of the ram 25, in the manner to be described.

In the event that the form constitutes a pattern plate or a thin original which is substantially thinner than standard type and consequently is more readily cooled when coming in contact with a cold surface, the stop arms 45 and 46 may be shifted by means of the set lever 60 to the position shown in Figure 4, so as to release the ram and permit the same to come to rest in its lower position against the boss 38 of the cylinder 14. In this position, the top of the platen 28 is below the plane of the flanges 36 of the brackets 34. The form is then positioned on the flanges 36 and is held thereby out of contact with the cold platen 28 so that the platen is prevented from cooling the assembly until the molding operation is begun.

In order to supply the fluid under hydraulic pressure for molding purposes, the motor 67 is started by actuating the switch 94, thereby causing the pumps 68 and 69 to be in operation. The pump 68 supplies fluid, for example oil, at a comparatively low pressure, such as 25 lbs. per sq. inch. Fluid under this pressure passes through the pipe 132 to the high pressure pump 69 and through the check valve 135 to fill the system. As soon as the pressure of the fluid in the pipe 136 is built up, by the operation of the pump 69, to a pressure above that in the pipe 132, the stop valve 135 closes, and the high pressure system, including the pipe 136 and the pipe 144, is maintained at a pressure determined by the setting of the adjustable, spring-loaded, pressure-regulating valve 100.

Adjustment of the fluid pressure is then made by actuating the adjusting wheel 98 and noting the reading of the gauge 147 so as to obtain the predetermined high pressure in the high pressure pipe 136. Any excess of fluid pumped by the pump 69 is then returned by means of the pipe 145 to the reservoir. Likewise, any excess of fluid pumped by the pump 68 is returned through the pressure-relief valve 126 and the pipe 127 to the reservoir. Inasmuch as the capacity of the low pressure pump 68 is much greater than that of the high pressure pump 69, a substantial quantity of fluid will under normal conditions be returned through the pipe 127. The pipe 145 normally returns the portion of the fluid pumped by the high pressure pump 69 that is not required for making up the leakage loss or for maintaining the desired pressure on the system.

With the fluid pressure built up and regulated as above indicated, the press is now ready for operation. The operating lever 91 is then actuated to shift the valve slide 85 and to connect the pipe 151, which leads to the cylinder 14, to the high pressure pipe 136. When this occurs, the high pressure fluid is supplied beneath the ram 25 and tends to elevate the ram and the platen 28.

The cylinder 14 is of comparatively large volume with respect to the capacity of the high pressure pump 69, and if this pump were relied upon for elevating the ram, the operation would be comparatively slow. However, in elevating the ram, only sufficient force is required to overcome the weight of the parts, and this force may be obtained by supplying fluid directly from the low pressure pump 68. Consequently, as soon as the pressure on the pipe 136 is relieved by actuation of the valve slide 85, the check valve 135 opens and allows fluid from the pipe 122 to pass directly through the pipe 136, the valve 83 and the pipe 151 to the cylinder 14, thereby rapidly elevating the ram until the mold assembly is brought into contact with the stationary head 10. When this occurs, the continued operation of the high pressure pump 69 raises the pressure in the pipe 136, first to a point such that the stop valve 135 closes, and then to the point determined by the setting of the adjustable valve 100. Thereafter, this high pressure is automatically maintained by the operation of the valve 100 until the ram is released by actuating the operating handle 91 to shift the valve slide 85 so as to close the port 137 and to connect the pipe 151 with the return pipe 154 (as shown in Figure 5). The supply of fluid under pressure to the cylinder 14 is thus interrupted, and the fluid in the cylinder is allowed to return to the reservoir 66.

By way of example, the low pressure pump 68 may build up a pressure in the pipe 122 of 25 lbs. per sq. inch, whereas the high pressure pump may build up a pressure of 50 tons per sq. inch. By means of the system above described, the full capacity of the low pressure pump 68 is utilized for causing the major portion of the movement of the ram 25. After contact has been made with the stationary head 10, only a limited further movement of the ram takes place. The fluid for effecting this limited movement is supplied by the high pressure pump 69, and the predetermined high pressure is automatically maintained by the high pressure pump at the point determined by the setting of the valve 100.

Inasmuch as the entire operation is extremely rapid, it would be impractical to adjust the molding pressure while the molding operation is taking place. The present invention, however, provides for pre-setting the molding pressure, Then, by the simple operation of the operating lever 91, the molding pressure is built up to the desired point and is maintained at that point until the molding operation is completed.

In certain instances, the heated apron 79 may be omitted. It has been found useful, however, in order to prevent the form from cooling prior to the molding operation while it is being made ready for insertion in the press. If it is found that contact with the cold platen 28 does not unduly cool the thermoplastic sheet, the form may be inserted directly on the platen instead of being positioned on the raised flanges 36. In such instances, the brackets 34 may be omitted or the platen may be brought into an elevated position by means of the stop arms 45 and 46 above described.

It may be found that when operating with certain materials the cooling of the platen 28 or of the head 10, or both, may be unnecessary, in which event the circulation of cooling fluid to the ducts 20 or 31 may be interrupted.

In the embodiment above described, the cold head 10 and platen 28 serve to cool the thermoplastic material to a sufficiently low temperature to set the same while it is held under forming pressure, so that, when the pressure is released and the mold is removed from the type form, the type impressions are permanently retained therein in a condition suitable for the formation of an electrotype plate therefrom. Due to the high pressure employed and the cooling of the mold while under molding pressure, the type impressions are sharp and clearly defined and the mold is capable of producing an electrotype plate of extremely high quality.

While a specific embodiment of the invention has been described, it is to be understood that various changes and modifications may be made therein as will be readily apparent to a person skilled in the art. The invention is only to be limited in accordance with the scope of the following claims.

I claim:

1. A press for molding an electrotype mold on a type form or the like, comprising a stationary head mounted on pedestal bolts, a movable platen adapted to cooperate with said head for applying molding pressure to said mold, guides on said platen bearing against said pedestal bolts to guide said platen as it is raised and lowered, interconnected stop means to hold the platen at an intermediate position above its fully retracted position, downwardly extending brackets carried by said head and having flanges out of alignment with the path of said platen and registering with the top surface thereof when in said intermediate position to guide and support said type form or the like prior to molding, and means rendering said stop means inoperative whereby the platen is allowed to drop to its fully retracted position out of contact with the type form supported on said flanges.

2. A press for molding an electrotype mold on a type form or the like, comprising a stationary head, a movable platen adapted to cooperate with said head for applying molding pressure to said mold, stop means comprising arms adapted to hold said platen in an intermediate position above its fully retracted position, said arms being interconnected and pivoted for movement into piston-releasing position wherein the platen is released and allowed to assume its fully retracted position, and a set lever to actuate said pivoted arms.

3. A press for molding an electrotype mold on a type form or the like, comprising a stationary head, a movable platen adapted to cooperate with said head for applying molding pressure to said mold, stop means comprising pivoted arms adapted to hold the platen in an intermediate position above its fully retracted position, stationary supporting means comprising flanges out of alignment with the path of said platen and registering with the top surface thereof when in said intermediate position to guide and support said type form or the like prior to molding, said arms being pivoted for movement to inoperative position for releasing said platen and allowing the same to assume its fully retracted position, and a set lever to actuate said arms.

4. A press for molding an electrotype mold on a type form or the like, comprising a stationary head mounted on pedestal bolts, a movable platen adapted to cooperate with said head for applying molding pressure to said mold, guides on said platen bearing against said pedestal bolts to guide said platen as it is raised and lowered, a ram carrying said platen and having a peripheral flange, stop means comprising arms adapted to engage beneath said flange for holding said platen in an intermediate position above its fully retracted position, a stationary support comprising brackets out of alignment with the path of said platen and registering with the top surface thereof when in said intermediate position to guide and support said type form or the like prior to molding, said arms being interconnected and pivoted for simultaneous movement out of the path of said flange for releasing said platen and allowing the same to assume its fully retracted position out of contact with the type form supported on said brackets.

5. A press for molding an electrotype mold on a type form or the like, comprising a stationary head, a movable platen adapted to cooperate therewith, and hydraulic means to actuate said platen comprising a fluid pressure cylinder, a piston in said cylinder connected to actuate said platen, a line supplying fluid under pressure to said cylinder for actuating said piston, a control valve to control a supply of fluid from said line to said cylinder, a high pressure pump connected to maintain a predetermined fluid pressure in said line regardless of the position of said control valve, a low pressure pump connected in series with said high pressure pump and to said line through a check valve, said low pressure pump having a fluid capacity greater than said high pressure pump whereby fluid for initiating the operation of said piston is supplied thereby to cause said piston to be elevated rapidly to molding position, said check valve being adapted to close when a pressure greater than that supplied by said low pressure pump is built up by said high pressure pump whereby the predetermined high molding pressure is maintained in said line after the piston reaches molding position.

6. A press for molding an electrotype mold on a type form or the like, comprising a stationary head, a movable platen adapted to cooperate therewith, and hydraulic means to actuate said platen comprising a fluid pressure cylinder, a piston in said cylinder connected to actuate said platen, a line supplying fluid under pressure to said cylinder for actuating said piston, a control valve to control a supply of fluid from said line to said cylinder, a low pressure high capacity pump connected to said line through a check valve, a pressure-relief valve connected in said line to limit the pressure of the fluid supplied by said low pressure pump, a high pressure low capacity pump connected to receive fluid from the high pressure side of said low pressure pump and to supply fluid at a higher pressure to said line, an adjustable pressure-regulating valve connected to control the pressure built up by said high pressure pump, whereby the system may be pre-set to operate at a predetermined high pressure and, when the control valve is actuated to supply fluid to said cylinder, the fluid is first supplied by said low pressure pump through said check valve to initiate the operation of the piston and to cause the piston to be elevated rapidly to molding position, and whereby molding pressure is subsequently supplied by said high pressure pump after the pressure in said line has been built up to a value sufficient to close said check valve.

7. A press for molding an electrotype mold on a type form or the like, comprising a stationary head, a movable platen adapted to cooperate therewith, and hydraulic means to actuate said platen comprising a fluid pressure cylinder, a piston in said cylinder connected to actuate said platen, a line supplying fluid under pressure to said cylinder for actuating said piston, a control valve to control a supply of fluid from said line to said cylinder, a fluid reservoir, a low pressure pump connected to receive fluid from said reservoir and to supply said fluid through a check valve to said line, a return line connected between the high pressure side of said pump and said reservoir, a pressure-relief valve in said return line to limit the pressure of said pump, a high pressure pump connected to receive fluid from the high pressure side of said first pump and to supply fluid at a higher pressure to said line, a return line connected between the high pressure side of said high pressure pump and said reservoir, and an adjustable pressure-regulating valve connected in said last return line to limit the pressure built up by said high pressure pump, whereby the system may be pre-set to supply a predetermined high pressure to said line and, when the control valve is actuated to supply fluid to said cylinder, fluid is first supplied from said low pressure pump through said check valve to said line for initiating the operation of said piston and to cause the piston to be elevated rapidly to molding position, and whereby after the pressure has been built up to a point sufficient to close said check valve the high pressure pump thereafter builds up the predetermined high pressure in said line for molding.

8. A press for molding an electrotype mold on a type form or the like comprising a stationary head, a vertically moving ram provided with a peripheral flange, a platen carried by said ram and adapted to cooperate with said head for applying molding pressure to said mold, stop means comprising a pair of stop arms, means inter-connecting said stop arms to permit said stop arms to swing in unison to their operative or inoperative position, means to limit the downward movement of said arms, means carried by each of said stop arms and adapted to engage beneath said flange and limit the movement of the platen, and means to control the position of said stop arms.

9. A press for molding an electrotype mold on a type form or the like comprising a stationary head, a cylinder containing a vertically moving ram provided with a peripheral flange, a platen carried by said ram and adapted to cooperate with said head for applying molding pressure to said mold, a pair of rods carried by said cylinder, a stop arm on each of said rods, means inter-connecting said stop arms to permit said stop arms to swing in unison to their operative or inoperative position, a stop on each of said arms to limit the movement of said arm, adjustable means carried by each of said stop arms and adapted to engage beneath said flange and limit the downward movement of the platen, and a set lever connected to one of said rods to control the position of said stop arms.

GEORGE W. BUNGAY.